Feb. 24, 1931.  W. I. STAAF, SR  1,793,875
ROTARY INTERNAL COMBUSTION ENGINE
Filed Jan. 27, 1927   6 Sheets-Sheet 1

Feb. 24, 1931.  W. I. STAAF, SR  1,793,875
ROTARY INTERNAL COMBUSTION ENGINE
Filed Jan. 27, 1927  6 Sheets-Sheet 3

INVENTOR

Feb. 24, 1931. W. I. STAAF, SR 1,793,875
ROTARY INTERNAL COMBUSTION ENGINE
Filed Jan. 27, 1927  6 Sheets-Sheet 4
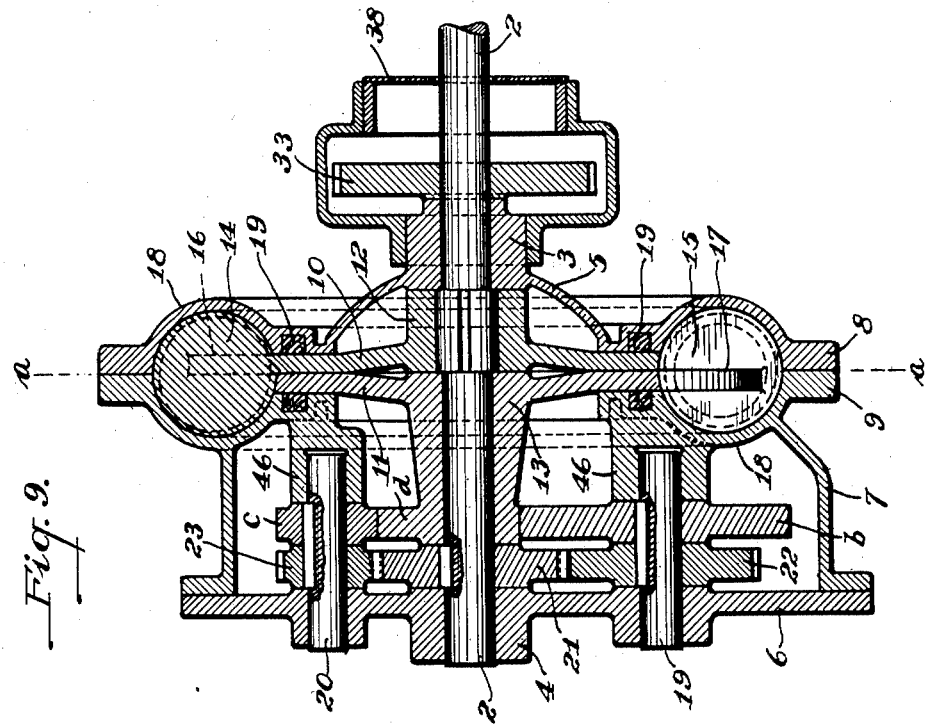
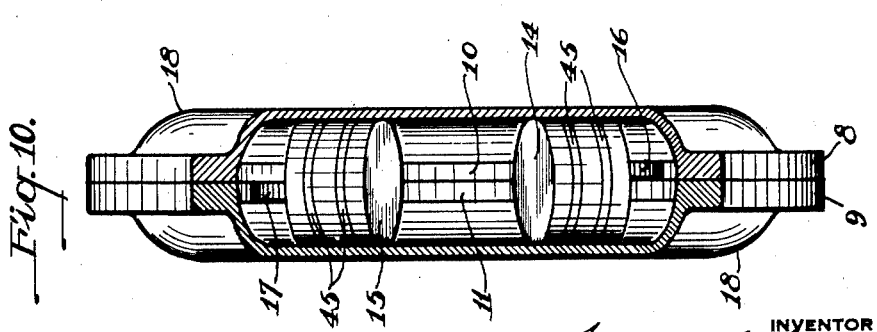
INVENTOR Feb. 24, 1931.  W. I. STAAF, SR  1,793,875
ROTARY INTERNAL COMBUSTION ENGINE
Filed Jan. 27, 1927   6 Sheets-Sheet 5

INVENTOR
Werner I. Staaf Sr.
by C. M. Clarke
atty

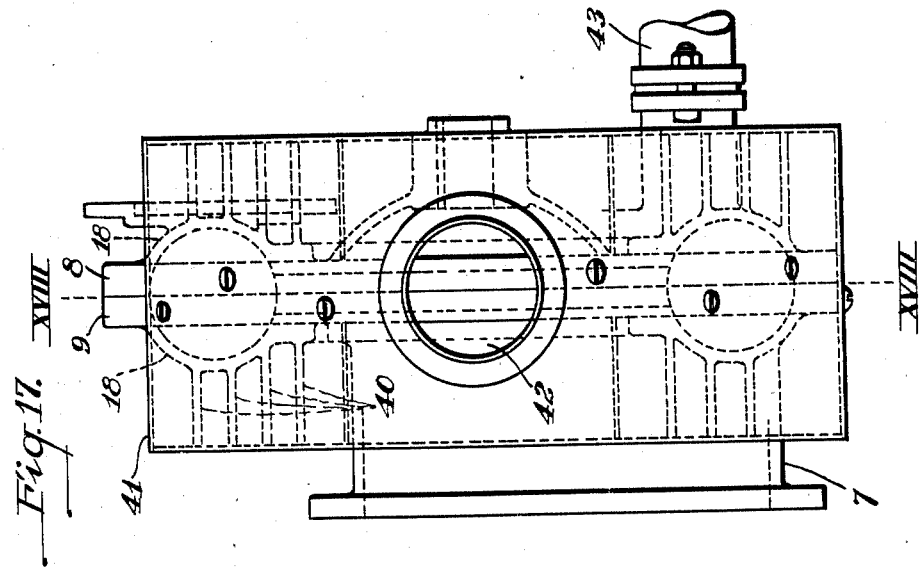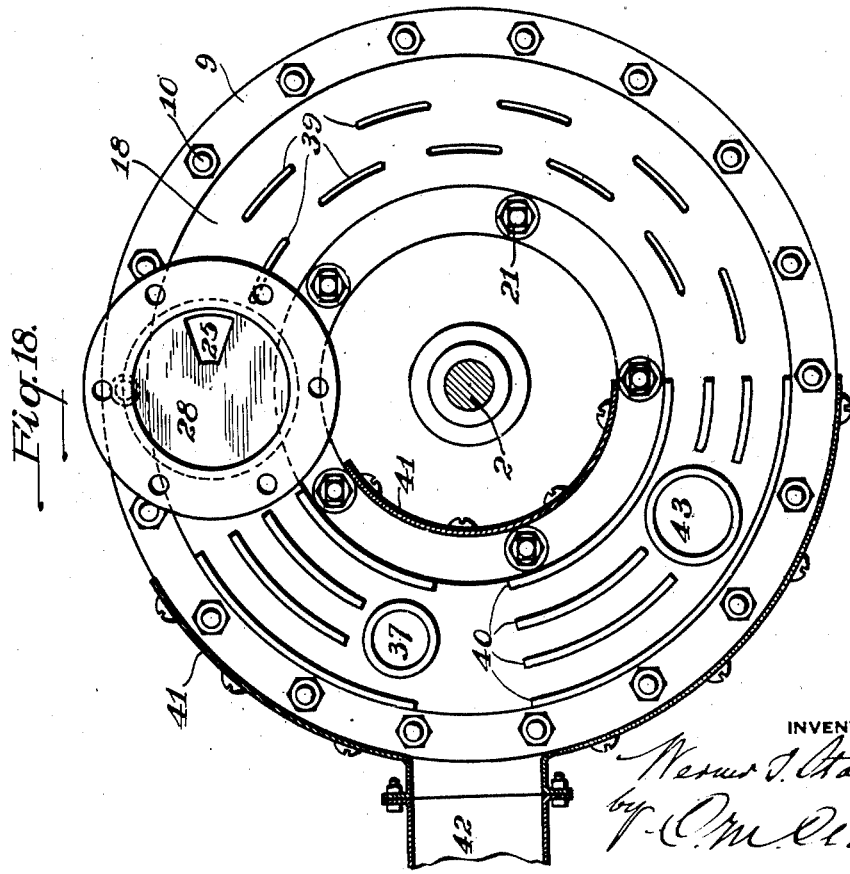

Patented Feb. 24, 1931

1,793,875

UNITED STATES PATENT OFFICE

WERNER I. STAAF, SR., OF PITTSBURGH, PENNSYLVANIA, ASSIGNOR OF FIFTY-ONE ONE-HUNDREDTHS TO WILLIAM W. MARTIN, OF PITTSBURGH, PENNSYLVANIA

ROTARY INTERNAL-COMBUSTION ENGINE

Application filed January 27, 1927. Serial No. 163,904.

My invention refers to improvements in rotary engines of the internal combustion type. It has in view to provide a construction whereby the efficient force of power of an explosive mixture may be utilized throughout a continuous series for direct transmission of power to a main shaft, without the use of intervening connecting rods.

The invention utilizes pairs of abutments or piston heads, or p.eferably by a plurality of pairs thereof, one of said abutments forming a portion of a driving disk or wheel connected with or forming a portion of such main shaft, while the other abutment or head forms a portion of a relatively movable disk or head co-operable therewith. The function of such relatively movable head and its abutment, is to form, with the abutment of the driving head, the back and front walls of an explosion chamber, within a continuous annular casing therefor.

Such casing provides the passageway for such abutments, and I have provided means for variably moving the rear or resistance abutment with relation to the impact abutment, so as to effect the necessary cycle operation of the engine as to suction, compression, explosion and exhaust, together with corresponding cycle operations for cooling of the working parts, as shall be more fully hereinafter described.

The engine as a whole and its several parts in certain preferred embodiments of the invention, is illustrated in the accompanying drawings, in which:

Fig. 9 is a sectional view through the engine on the broken line IX—IX of Fig. 7;

Fig. 10 is a sectional edge view of the casing, showing a pair of the co-acting abutments and their disks within the casing;

Figure 1:
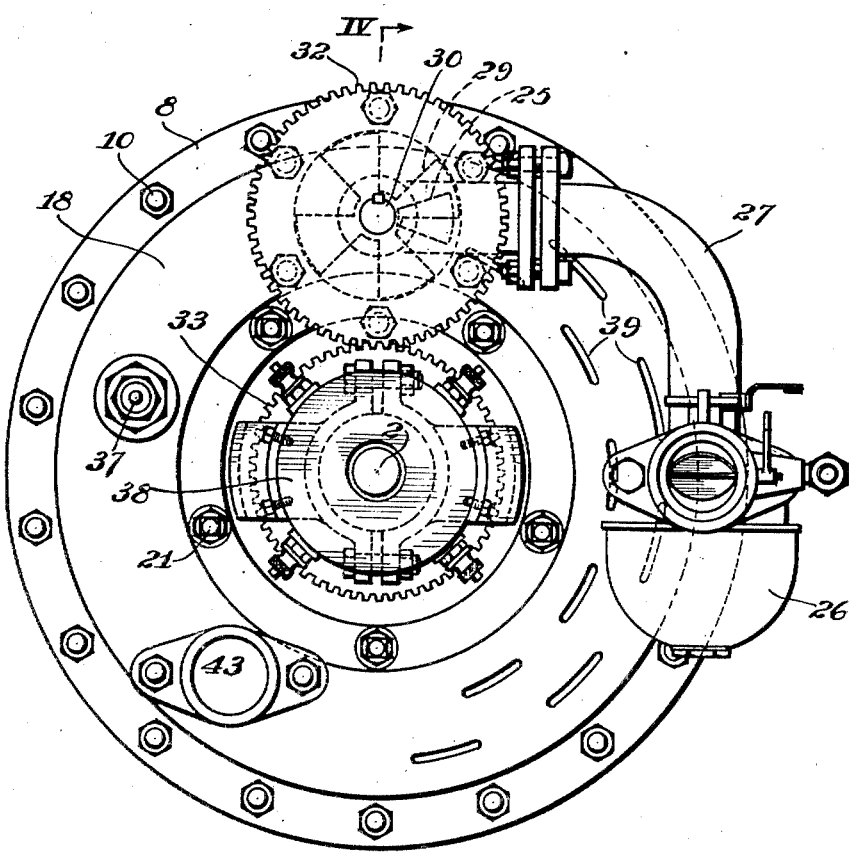
Fig. 1 is a view of the engine in end elevation.
Figure 2:
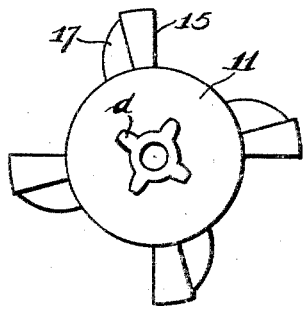
Figs. 2 and 3 are detail views in elevation of the associated abutment disks or heads, detached.
Figure 3:
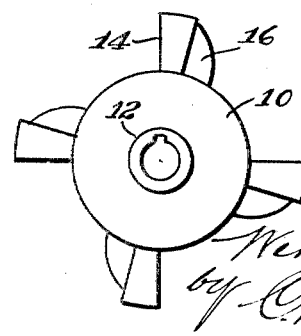

Figs. 11 to 16 inclusive are diagrammatic views, showing the successive operative positions of the pairs of abutments or heads of the co-operating disks;

Fig. 17 is an edge view of the engine partly broken away, showing the casing for the cooling air;

Fig. 18 is a face view thereof, the casing being in section on the line XVIII—XVIII of Fig. 17.

Referring to the drawings, 2 is the main shaft of the engine which is mounted in bearings 3 and 4 respectively, of the casing 5 and of the casing end plate 6.

Casing 5 at one side of the center line a, a, Fig. 9, forms one side of the enclosing housing for the working parts of the engine, while a co-acting casing 7, at the other side, forms the other side portion thereof.

The outer portions of casing 5 and 7 terminate in flanges 8 and 9, respectively, which are bolted together by bolts 10, and enclose between them the annular passageway for the pairs of co-operating abutments or piston heads of the fixed and relatively movable disks 10 and 11.

Of these, disk 10 is keyed or otherwise fixedly connected with the main shaft 2 by its hub 12, while hub 13 of disk 11 is freely rotatable on the shaft.

Disk 10 is provided with a plurality of abutments 14, while disk 11 is provided with a plurality of similar abutments 15. These abutments confront each other, and are fixedly connected with and form a portion of their respective disks by means of connecting brackets 16 and 17 respectively, whereby the disks are capable of moving annularly through the circular interior of the casing 18.

Such casing is formed of a semi-circular portion of the main casing members 5 and 7 each, respectively, and is in the nature of an annular cylinder through which the pairs of abutments 14, 15, annularly move.

Space is provided, as shown in Fig. 9, for the disks 10 and 11, providing the supporting connection for the several abutments, which disks are set closely together and are in packed relation with the casing by packing 19. Such packing may consist of any suitable means, as rings of metal or other material, supplemented by re-acting springs 20' and adjusting bolts 21 therefor, as in Fig. 4. The inner contacting faces of the disks are in relatively movable contact with each other, and are intended to be thoroughly lubricated by means of any suitable lubricant contained within the casing.

In the operation of the engine, it is designed that an explosive mixture shall be introduced between two adjacent abutments or piston heads 14, 15; shall be compressed thereby; then exploded, and with actuation of the following abutment 15 by the active abutment 14 providing opposing resistance to the explosion by said abutment 15. Such operation is followed by an accelerated abutment movement tending to expel the waste gases with a following suction, due to retarded movement thereof.

Figure 7:
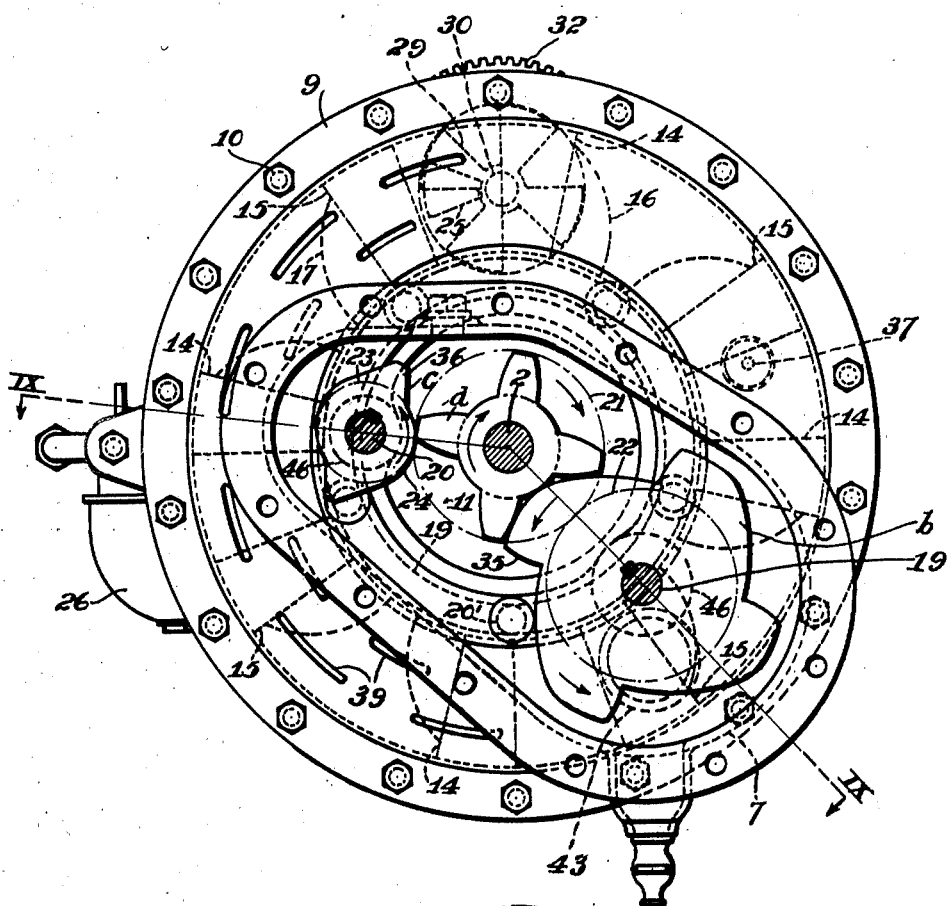
Fig. 7 is a view in elevation similar to Fig. 1, from the opposite side, the casing end plate and its bolts being removed on the line VII—VII of Fig. 4.

For the purpose of effecting such movement, it is designed that the movement of abutment 15 shall be faster and slower than that of the abutment 14, which function is performed by the several cams shown on Fig. 7.

Of these, a cam $b$ is mounted on a stub-shaft 19' and a cam $c$ is mounted on a stub-shaft 20, which cams act alternately on the star wheel or pinion $d$ of the relatively slow and fast moving abutment disk 11. Cams $b$ and $c$ are actuated directly from the power shaft 2 by means of a pinion 21 keyed thereon, engaging a pinion 22 of stub-shaft 19' and pinion 23 of stub-shaft 20. By this means, movement is transmitted to each stub-shaft, which, in turn, actuates its cams $b$ and $c$ respectively, at speeds regulated by the relative diameters of the several pinions 21, 22 and 23 respectively.

Figure 8:
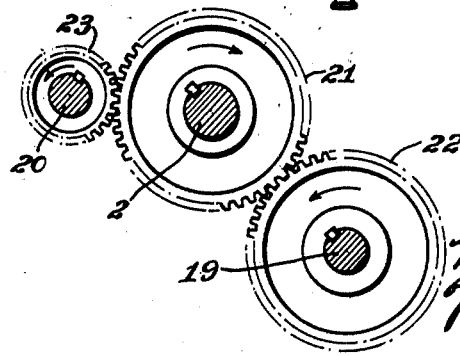
Fig. 8 is a diagrammatic view detached, showing the train of cam actuating gearing.

As shown in Fig. 8, pinions 21 and 22 are of the same diameter, whereas pinion 23 is one-half the diameter of its driving pinion 21, with a resulting doubling of speed or rotation of stub-shaft 20 and cam $c$, compared to the main shaft and pinion $d$.

As shown, cam $b$ engages the wheel $d$ for rotation of the freely movable or floating disk 11, and the proportions of the cam and wheel are such as to effect an increase of movement of the disk 11 and approach of abutment 15 toward abutment 14, followed by a relatively slower movement of the disk, resulting in a gradual separation of disk 15 from disk 14, while both disks are, however, moving around within the casing in the same direction.

The gearing 21, 22, 23, effects the same total movement and number of R. P. M. for both disks, but the intervening cam gearing imparts a relatively faster and slower movement to the floating disk, throughout each cycle, so that in each revolution said disk moves faster and slower than its companion disk of the main shaft.

It will be observed that the hub 24 of cam $c$ is gradually increased in diameter from the base of one of its opposite teeth to the base of the other, by an eccentric bearing face, as in Fig. 7, so that, as the cam $c$ rotates at its relatively faster or doubled rate of speed, the face 24 acts in the manner of an eccentric against the terminal of the adjacent tooth of wheel $d$, tending to constantly interlock therewith and engage it.

The purpose of such action is to provide a reinforcing bearing against the teeth of gear $d$ successively, under the reactive effect of the explosive and expansive action of the gases, whereby to hold abutment 15 in its re-acting position with relation to abutment 14. That is to say, during the time that the eccentric face 24 is in engagement with the terminal of the tooth of gear $d$, abutment 15 is relatively stationary, as to abutment 14, while moving around with it, and in resisting position to the explosive effect of the gases. Immediately before and after such action, the pinion $d$ is actuated by arm $b$ and the projecting teeth of cam $c$.

The successive positions of the co-acting abutments 14 and 15, under the controlling action of the cams $b$ and $c$ respectively, is best illustrated in Figs. 11 to 16 inclusive.

In operation, the driving disk 10 of the engine, receiving its impetus from the successive explosions acting against the abutments 14, maintains shaft 2 at a rate of rotation depending upon the amount of the explosive mixture and the braking load.

On the other hand, the corresponding rotation of disk 11 is alternately faster and slower, with an ultimate total peripheral movement equalling that of disk 10. This variable movement is effected by engagement with the teeth of pinion $d$, of the teeth of cam $b$ and of cam $c$ in the successively acting positions illustrated in said figures.

Figure 11:
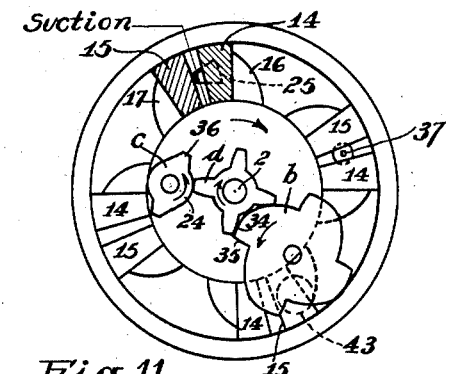

Thus, in Fig. 11, abutments 14 and 15 are at their closest relative position and in registering relation with the intake supply for 25 for the mixture, furnished to the interior of the cylindrical casing from the carburetor 26 by conduit 27.

Incidentally, the mixture is supplied to the chamber 28 leading to port 25 and provided with a rotatable cut-off valve or damper 29, operating to admit explosive mixture to the interior of the cylinder only when the co-operating abutments are in receiving or suction position, in register with port 25.

Figure 4:
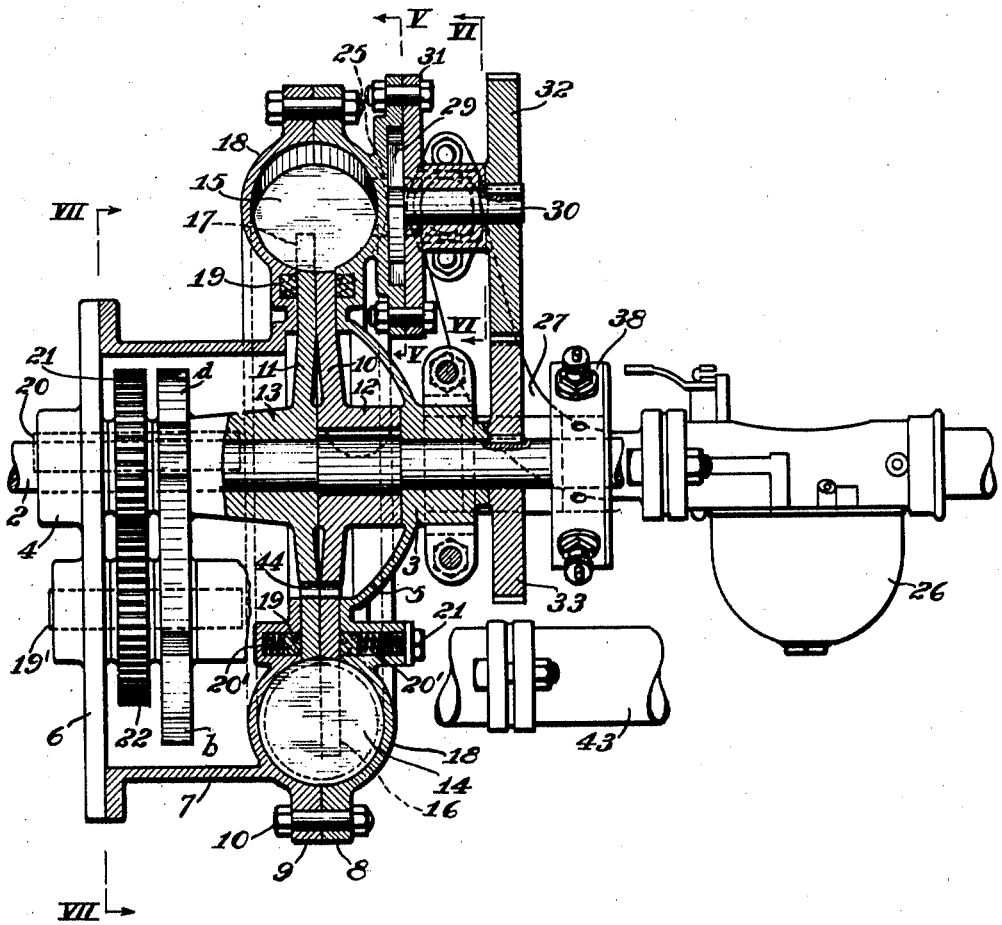
Fig. 4 is a sectional view on the line IV—IV of Fig. 1.
Figure 5:
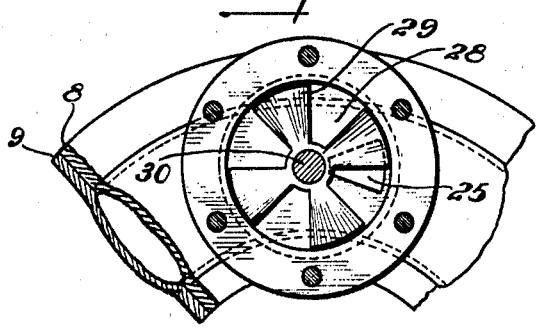
Fig. 5 is a detail sectional view on the line V—V of Fig. 4, showing the controlled admission port of the explosive mixture.
Figure 6:
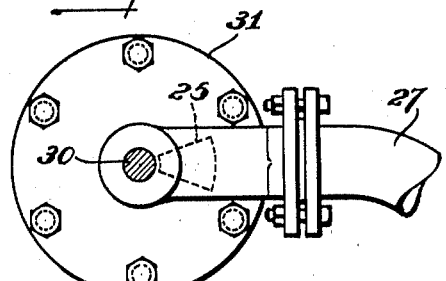
Fig. 6 is a similar view on the line VI—VI of Fig. 4.

Damper 29 is mounted on stem 30 in casing cover 31 and is actuated by gears 32, 33, from the main shaft 2, as clearly shown in Fig. 4.

Figure 12:
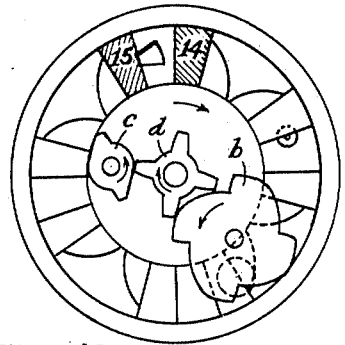
Figure 13:
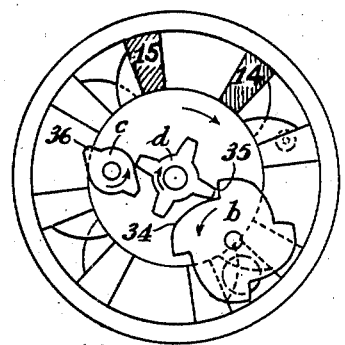

Abutments 14, 15, being thus in registering position for suction of the charge, it is desired that abutment 15 shall then be retarded temporarily during normal forward movement of abutment 14, for intake or suction, as in Figs. 12 and 13, before abutment 15 is then accelerated toward abutment 14 for compression.

Such retardation of abutment 15 is effected by the rounded portion 34 of cam $b$ wiping inactively between the adjacent teeth of pinion $d$, followed by engagement of the next oncoming tooth, by the shoulder 35 of the cam, as in Fig. 13.

During such engagement by rounded portion 34 of cam $b$ against and between the adjacent teeth of pinion $d$, such pinion and disk 11 and its abutments 15, are temporarily retarded during such time as the active abutment 14 advances beyond it under impact of the explosive gases. The re-active effect of the explosion is strongly resisted by the bracing action of cam $b$ during such engagement, assisted by the co-operating resistance of eccentric face 34 against the next adjacent tooth of pinion $d$.

Such condition exists only for and during the time necessary to provide for advance movement of abutment 14 and the bracing resistance of abutment 15, after which it is desirable to immediately effect speeding up or acceleration of the following abutment 15 toward abutment 14, for compression of the mixture. Such desirable increase of rotative speed is imparted to disk 11 by the co-operating action of teeth 36 and 35 of cams $c$ and $b$ respectively.

As in Fig. 13, at the commencement of the closing movement, the eccentric hub and terminal 36 of cam $c$ is acting to wipe against the tooth of pinion $d$ just in advance of the engagement of its opposite tooth by shoulder 35. The combined action of cam $c$ and $b$ in this manner, immediately following the temporary speed reduction and co-operating resistance to strain, effects a sudden increase in speed of disk 11, throwing abutment 15 at faster speed toward its companion abutment 14, which accelerated movement effects compression of the mixture.

Thereafter, the movement of abutment 15 is accelerated by such shoulder engagement and the proportions of the gears, assisted by the quick wiping action of the cam projection 36 of cam $c$.

Figure 14:
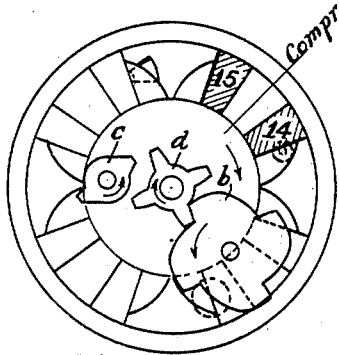
Figure 15:
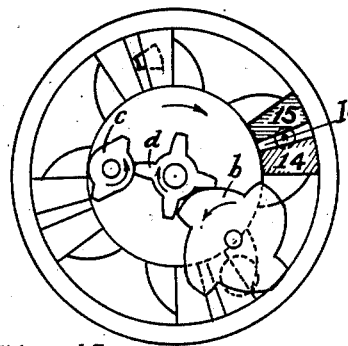
Figure 16:
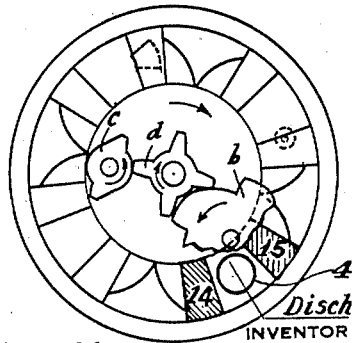

As shown in Figs. 13 and 14, such accelerated movement having been imparted to disk 11, abutment 15 effects compression of the mixture by such accelerated or gaining action of the rear abutment 15 toward the advancing or driving abutment 14. In this manner, the abutments are again brought together, as at the suction position, but at a point approximately 90° in advance thereof, for ignition of the compressed explosive mixture, as in Fig. 15.

Explosion of the mixture is effected by a suitable igniting device as a spark plug 37, the current for which is furnished by suitable conductors, not shown, in connection with a timer 38 and any other necessary or usual equipment customary with internal combustion engines, and not necessarily herein more fully illustrated or described.

At the position shown, the explosion of the gaseous mixture will effect a forward impulse against abutment 14 tending to rotate shaft 2, while abutment 15, being positively retained against re-active movement by the cam interference noted, (see Fig. 16) will momentarily hesitate in its relative forward speed, and will act as a resisting abutment for the explosive mixture after ignition and before discharge.

The alternating approach and separation of the abutments 14—15 thus effects compression and provides for expansion of the mixture and forward movement of the active head 14, after explosion, upon retardation of and resistance against head 15. By the speeding up of head 15, the heads together provide for expulsion of the waste gases through exhaust conduit 43.

Thereafter, the pulsating action of abutment 15 with relation to driving abutment 14, in the remainder of the complete revolution around the full peripheral travel of the cylinder, will effect inward suction of fresh air for scavenging and cooling with alternating expulsion thereof, and a succeeding intake and expulsion, before the pair of abutments again arrive at the suction or intake position of Fig. 11.

Such intake of fresh air is effected by means of a series of slotted openings 39 through the walls of the cylinder, as in Fig. 18. Such openings are preferably slotted in the annular direction of movement, with overlapping arrangement, whereby to provide for a free air supply and exhaust, which provision ensures clearance of all waste gases and ample and thorough cooling action.

As shown, I utilize plural sets of abutments, as four, each set consisting of a pair of co-acting abutments or piston heads of the disks 10 and 11, spaced equi-distantly and operating and controlled by the cams in the manner described.

The successive pairs of abutments coming into register with the explosive supply at the suction or intake position, Fig. 11, then effect the succeeding functions of compression, explosion, and exhaust, so that an impulse is thus given to the main shaft at each quarter revolution of disk 10, as long as the operation continues.

Additional cooling of the cylinder is effected by means of radiating ribs or fins 40 at each side of the cylindrical wall portions 13 enclosed by an outer sheet metal or other suitable casing 41 and provided with a cold air supply conduit 42 connected with a pump, fan, or other similar air supply element.

It will be understood from the foregoing description that the disks 10 and 11 move together in the same direction, but with a substantially uniform rate of speed of disk 10 and a constantly varying rate of speed of disk 11.

That the retardation of disk 11 is in constant harmony and co-operation with its alternating equal acceleration, so as to maintain at all times between the disks such varying movement during their combined rotation, as to effect the several functions of the entire necessary cycle of operations for each complete revolution of the pair of disks.

The disks, as shown, and as stated, are in practically gas-tight association by reason of their intimate tight sliding contact, due to the outer packing rings 19. The entire cavity within the casing 5, 6 and 7 is wholly or partially filled with a suitable lubricant, and the disks are preferably provided with circulating openings 44, providing for ample oil circulation and supply to the working faces.

The terminal edges of the disks are carefully shaped to the curvature of the respective piston heads or abutments 14, 15, such abutments being integral with or fixedly connected with their respective disks 10 and 11 by the brackets 16 and 17, so that there is a practically tight sliding connection between the inner peripheral edge of the abutment of one disk and the confronting edge of the other throughout.

By such arrangement, in connection with the surrounding resilient packing rings 45 of the piston heads, there is provided a practically gas-tight mounting of the piston heads in the annular piston chamber, providing for effective suction, compression, expansion, and exhaust of the active and waste gases respectively.

The starting of the engine may be effected by cranking, or by the use of any suitable mechanical starter of well-known construction, as the Bendix drive. The mounting of the several cams b and c on their shafts 19 and 20 for effective resistance to the strains is by the provision of end bearings 46 of the inner portions of casing 7 and the outer boss enlargements of casing 6, with intervening mounting of the cams and gearing in spline connection with the several shafts, including extension of main shaft 2, as clearly shown in Fig. 9.

While air cooling in the manner shown and described is effective and ordinarily sufficient for the purpose, it will be understood, of course, that water cooling may be utilized if desired, either alone or in combination with such air cooling.

Also, that the invention may be changed or varied in detail construction, dimensions, proportions, size and equipment, or otherwise by the skilled mechanic, to adapt it to various conditions or location of use, or otherwise, without departure from the principle of the invention, as expressed in the following claims.

What I claim is:

1. The combination with an annular tubular casing, of a pair of disks each provided with a piston abutment within the casing, a main shaft extending through and secured to one of said disks and provided with a pinion, a cam controlled wheel on the other of said disks, oppositely located controlling cams for said wheel, and actuating gear wheels therefor in driven engagement with the pinion of the main shaft.

2. The combination with an annular tubular casing, of a pair of disks each provided with a piston abutment within the casing, a main shaft extending through and secured to one of said disks, and provided with a gear wheel, a toothed wheel on the other of said disks, a pair of oppositely located cams operatively engaging said toothed wheel, and actuating gear wheels for said cams in driven engagement with the pinion of the main shaft.

3. The combination with an annular tubular casing, of a pair of disks each provided with a piston abutment within the casing, a main shaft extending through and secured to one of said disks, and provided with a gear wheel, a toothed wheel on the other of said disks, a cam having alternating holding and actuating engagement with said toothed wheel, an oppositely located cam having alternating holding and actuating engagement with said toothed wheel, and actuating gear wheels for said cams in driven engagement with the pinion of the main shaft.

4. The combination with an annular tubular casing, of a pair of disks each provided with a piston abutment within the casing, a main shaft extending through and secured to one of said disks, and provided with a gear wheel, a toothed wheel on the other of said disks, a cam having alternating holding and actuating engagement with said toothed wheel, an oppositely located cam having alternating holding and actuating engagement with said toothed wheel, and actuating gear wheels for said cams in driven engagement with the pinion of the main shaft, said gear wheels being proportioned to effect two revolutions of said last named cam during a single rotation of the first named cam.

5. The combination with a casing having an annular piston chamber, of a main driving shaft, a constant motion driving disk secured to said shaft and provided with a piston abutment in said chamber, a variable motion floating disk freely rotatable on said shaft and provided with a re-acting abutment in said chamber and a toothed wheel, cam mechanism geared with the shaft and engaging the toothed wheel of the floating disk for imparting variable movement thereto, means for packing said disks, and means for supplying an explosive mixture between the abutments thereof.

6. The combination with a casing having an annular piston chamber, of a main driving shaft, a constant motion driving disk secured to said shaft and provided with a plurality of piston abutments in said chamber, a variable motion floating disk freely rotatable on said shaft and provided with a corresponding plurality of re-acting abutments co-operating with the piston abutments in said chamber, a toothed wheel for the floating disk, cam mechanism geared with the shaft and engaging the toothed wheel of the floating disk for imparting variable movement thereto and to its abutments, means for packing said disks, and means for supplying an explosive mixture between the several piston and re-acting abutments.

7. The combination with a casing having an annular piston chamber, of a main driving shaft, a constant motion driving disk secured to said shaft and provided with a plurality of piston abutments in said chamber, a variable motion floating disk freely rotatable on said shaft and provided with a corresponding plurality of re-acting abutments co-operating with the piston abutments in said chamber, a toothed wheel for the floating disk, cam mechanism geared with the shaft for imparting variable movement to said toothed wheel and the floating disk and its abutments, means for packing said disks, means for supplying an explosive mixture between the several piston and re-acting abutments, means for igniting the mixture, and means for carrying off the products of combustion.

8. The combination with an enclosing casing having an annular piston chamber, a main shaft, a pair of disks, one secured to the shaft and the other freely rotatable thereon, each having piston and resistance abutments respectively extending into the piston chamber, an accelerating and retarding wheel on the freely rotatable disk, and a pair of oppositely located cams engaging the accelerating and retarding wheel, and driving mechanism therefor geared with the main shaft.

9. The combination with an enclosing casing having an annular piston chamber, a main shaft, a pair of disks, one secured to the shaft and the other freely rotatable thereon, each having piston and resistance abutments respectively extending into the piston chamber, an accelerating and retarding wheel on the freely rotatable disk, and a pair of variable speed cams engaging the accelerating and retarding wheel, and driving mechanism therefor geared with the main shaft.

10. Gearing for imparting variable movement to one of a pair of co-acting abutment disks of a rotary engine consisting of a toothed wheel on one of said disks, a pair of oppositely located variable speed cams engaging the toothed wheel, shafts therefor, a gear wheel for each of said cams, and a driving gear engaging said gear wheels and directly connected with the other of said disks.

11. Gearing for imparting variable movement to one of a pair of co-acting abutment disks of a rotary engine consisting of a toothed wheel on one of said disks, a wiping cam engaging the toothed wheel at one side, a holding and moving cam engaging the toothed wheel at its other side, shafts for said cams each having a gear wheel proportioned to each other as two to one respectively, and a driving gear engaging said gear wheels and directly connected with the other of said disks.

In testimony whereof I hereunto affix my signature.

WERNER I. STAAF, Sr.

CERTIFICATE OF CORRECTION.

Patent No. 1,793,875.                        Granted February 24, 1931, to

WERNER I. STAAF, SR.

It is hereby certified that the above numbered patent was erroneously issued to the inventor "Werner I. Staaf, Sr., and fifty-one one-hundredths to William W. Martin, of Pittsburgh, Pennsylvania", whereas said patent should have been issued to Werner I. Staaf, Sr., assignor of fifty-one one-hundredths to William W. Martin, of Pittsburgh, Pennsylvania; and Hannah Staaf, administratrix of said Werner I. Staaf, Sr., deceased, as shown by the records of assignments in this office; and that the said Letters Patent should be read with this correction therein that the same may conform to the record of the case in the Patent Office.

Signed and sealed this 5th day of May, A. D. 1931.

(Seal)                                                                         M. J. Moore,
                                                                            Acting Commissioner of Patents.